Feb. 16, 1965 F. S. HUMMEL 3,169,909
NUCLEAR REACTOR FUELLING MACHINE
Filed Feb. 15, 1963 14 Sheets-Sheet 1

Inventor
Frederick S. Hummel
By Stevens Davis Miller & Mosher
Attorneys

Feb. 16, 1965 F. S. HUMMEL 3,169,909
NUCLEAR REACTOR FUELLING MACHINE
Filed Feb. 15, 1963 14 Sheets-Sheet 3

Inventor
Frederick S. Hummel
By Stevens, Davis, Miller & Mosher
Attorneys

Feb. 16, 1965　　　F. S. HUMMEL　　　3,169,909
NUCLEAR REACTOR FUELLING MACHINE
Filed Feb. 15, 1963　　　　　　　　　　　　　　14 Sheets-Sheet 4

Inventor
Frederick S. Hummel
By Stevens, Davis, Miller & Mosher
Attorneys

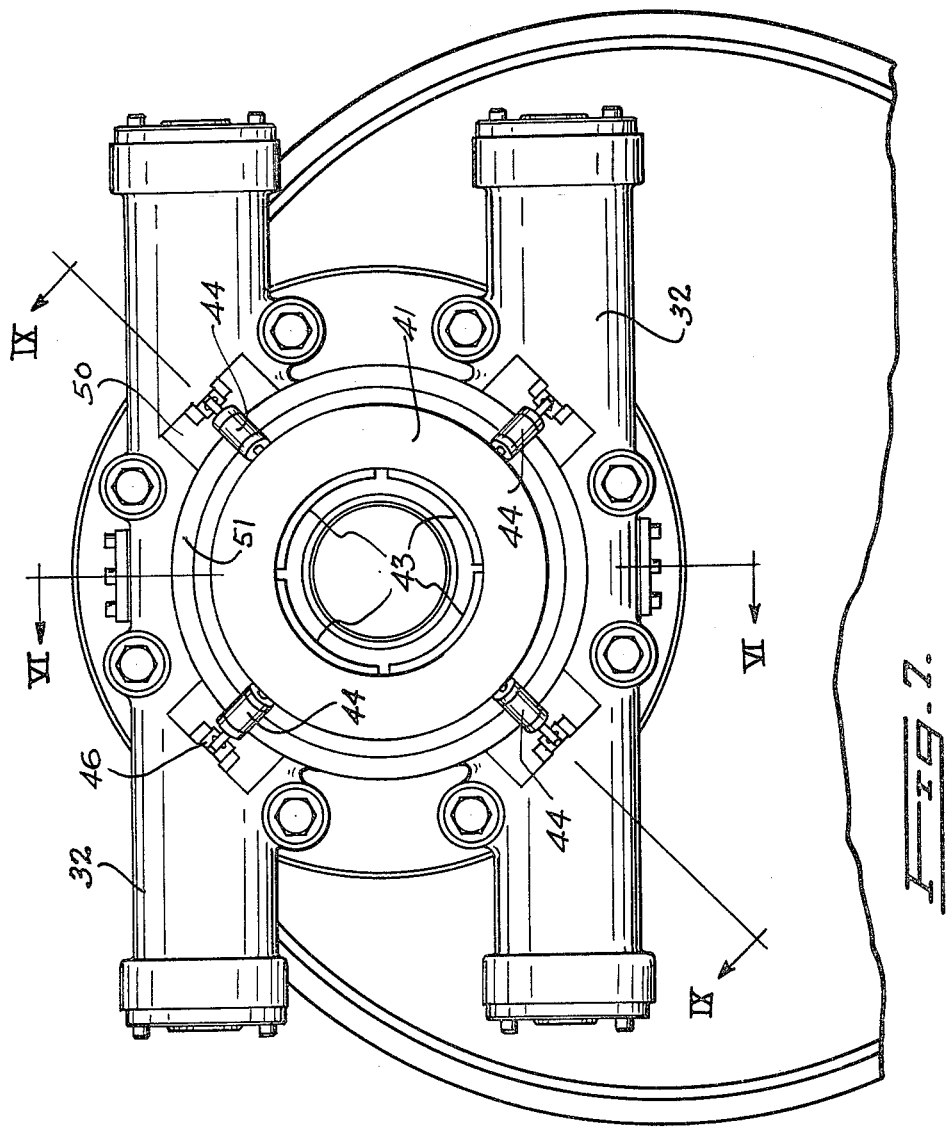

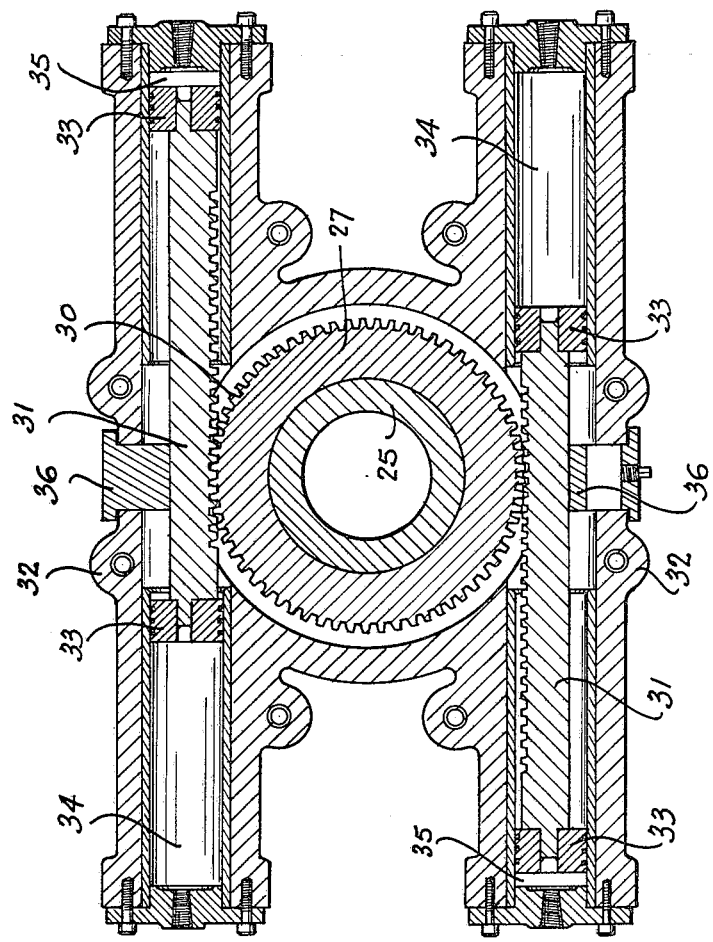

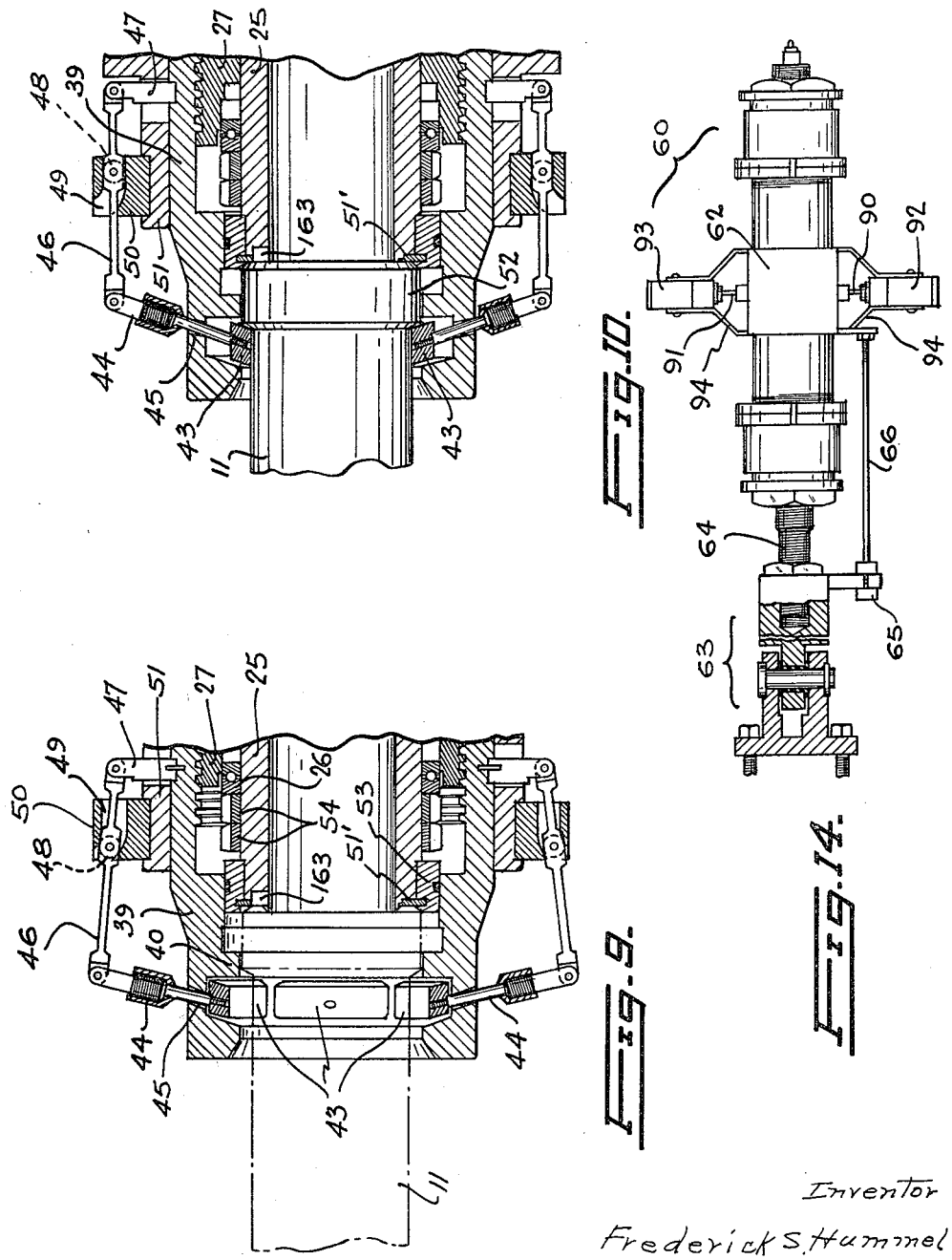

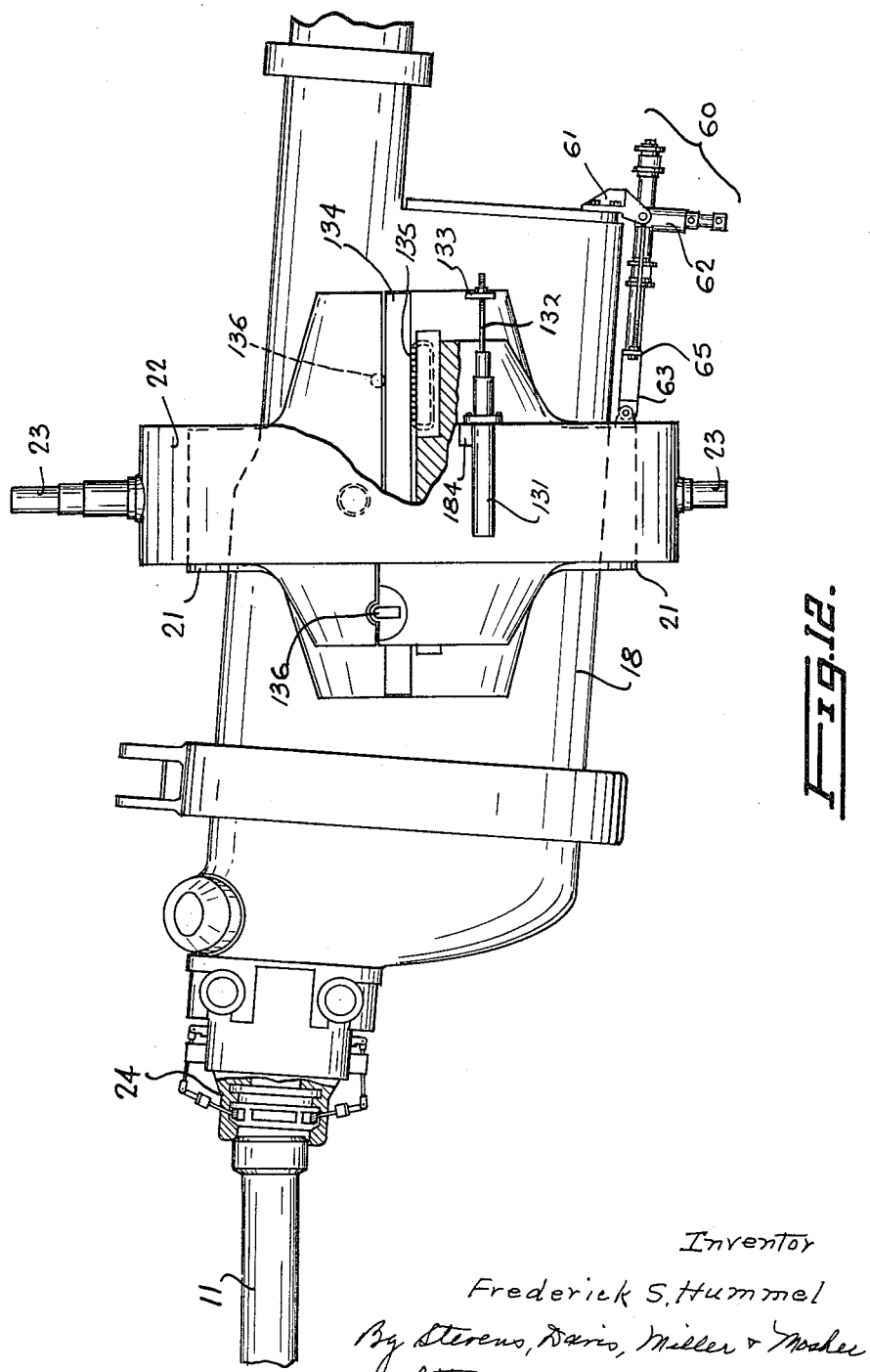

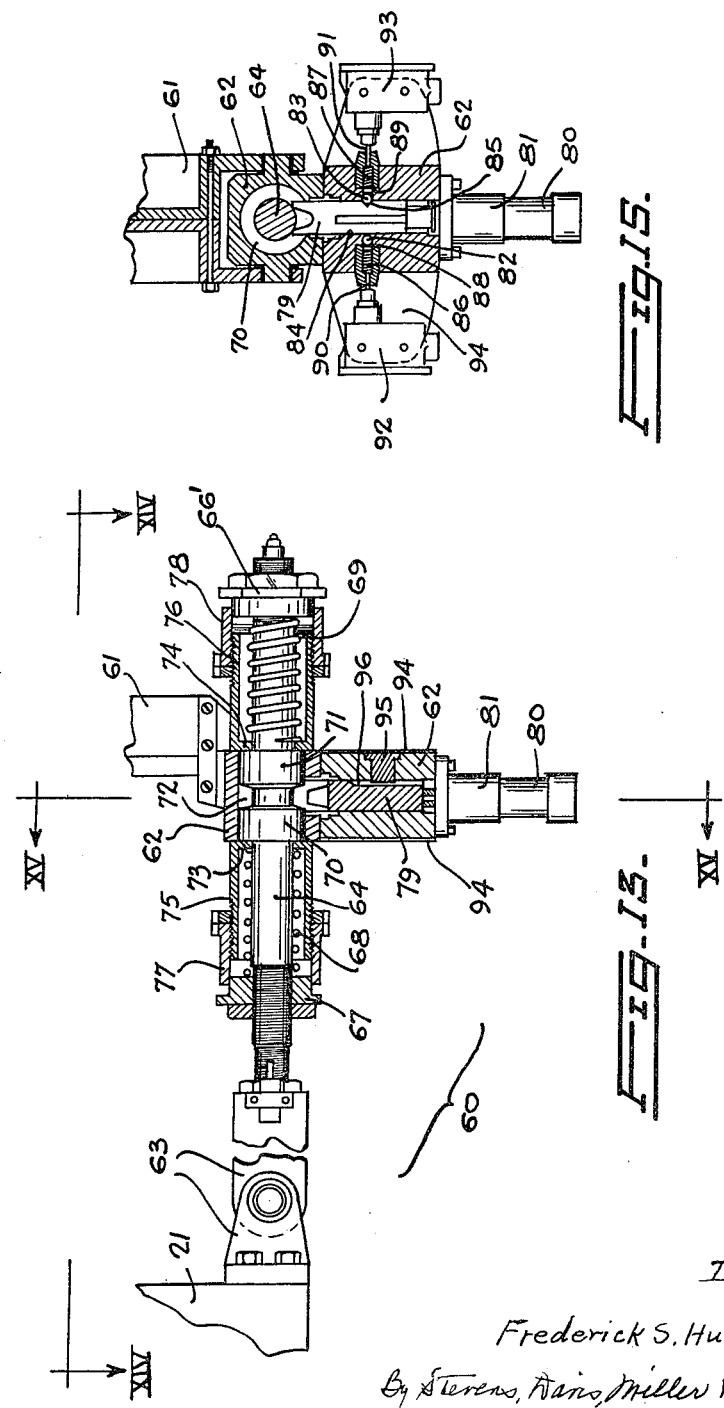

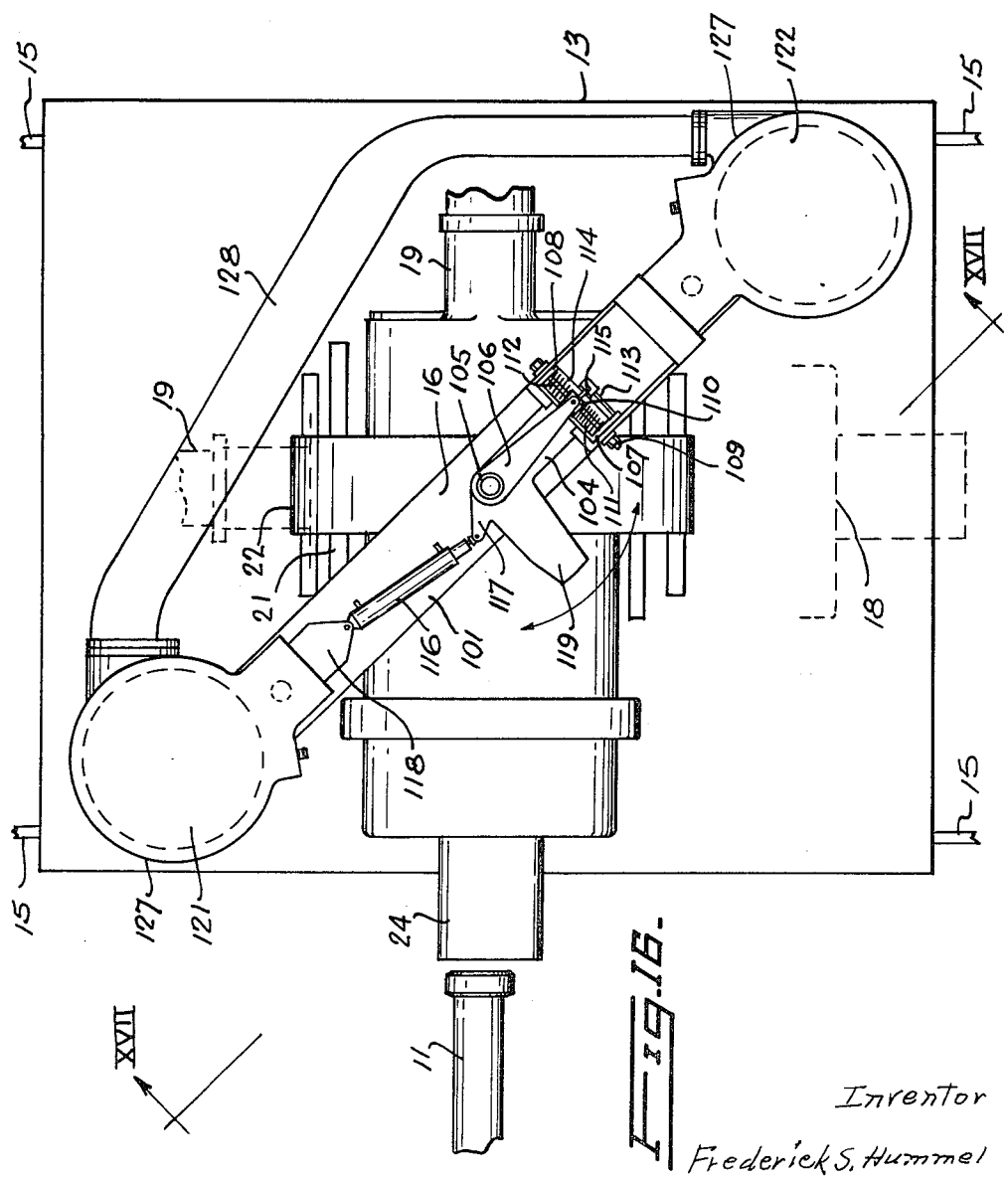

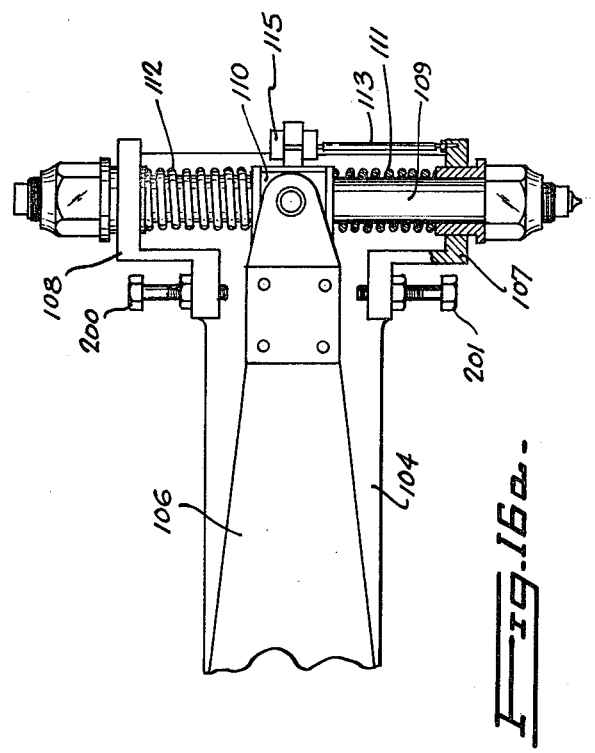

Feb. 16, 1965  F. S. HUMMEL  3,169,909
NUCLEAR REACTOR FUELLING MACHINE
Filed Feb. 15, 1963  14 Sheets-Sheet 12

Inventor
Frederick S. Hummel
By Stevens, Davis, Miller & Mosher
Attorneys

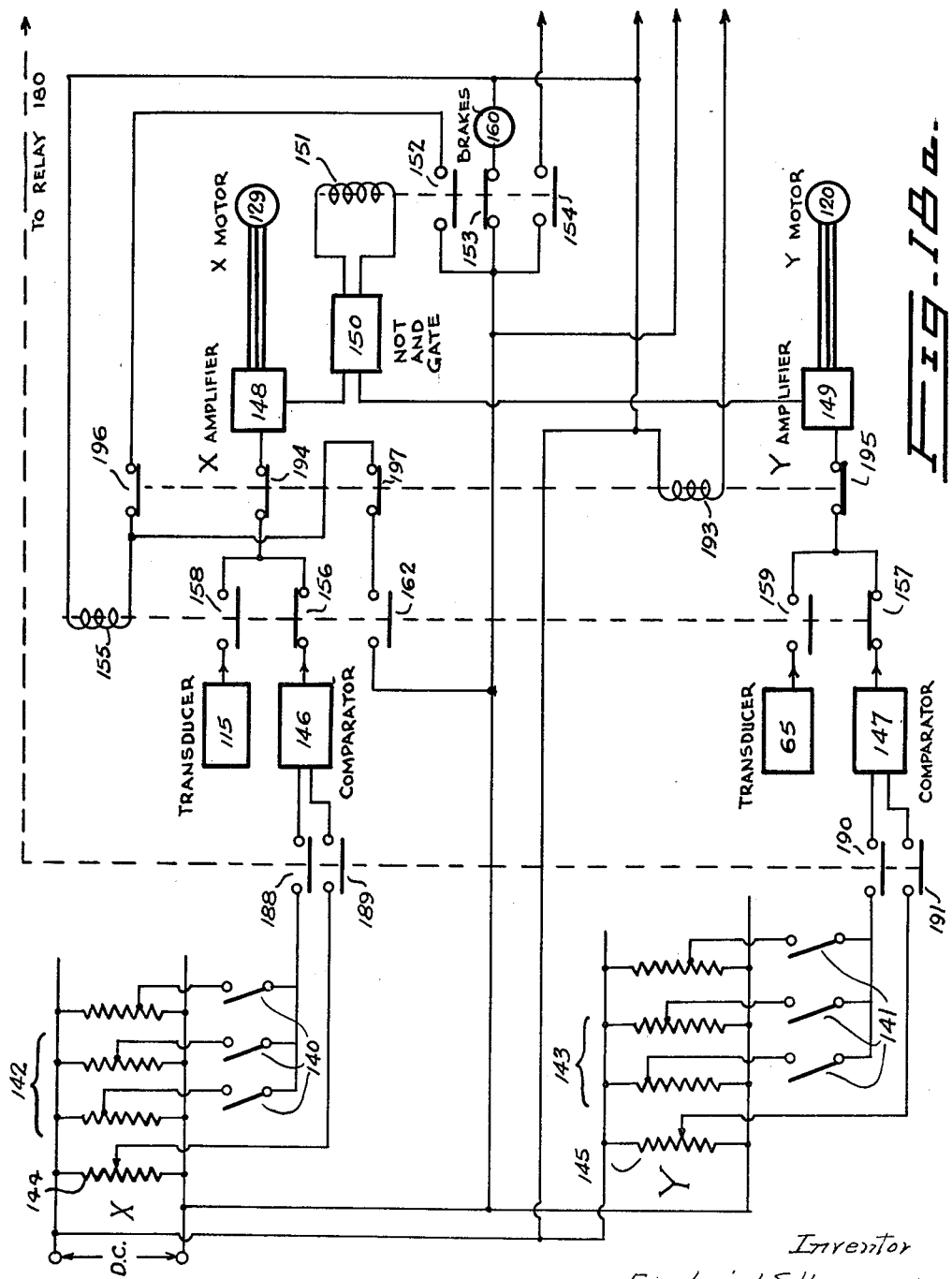

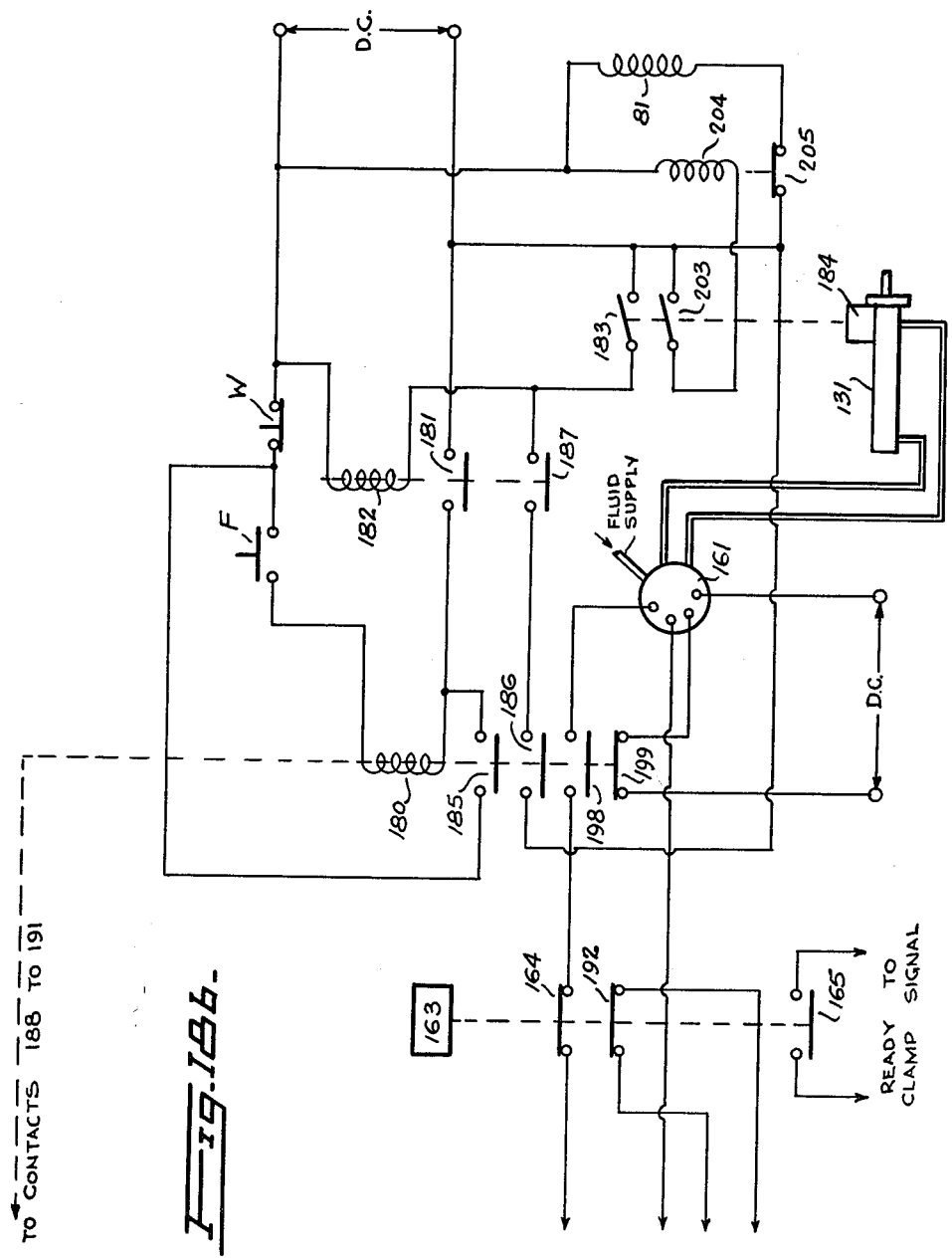

United States Patent Office 3,169,909
Patented Feb. 16, 1965

3,169,909
NUCLEAR REACTOR FUELLING MACHINE
Frederick S. Hummel, Islington, Ontario, Canada,
assignor to Atomic Energy of Canada Limited,
Ottawa, Ontario, Canada, a corporation
Filed Feb. 15, 1963, Ser. No. 258,700
Claims priority, application Canada, June 22, 1962,
852,176
9 Claims. (Cl. 176—30)

This invention relates to fuelling machines for nuclear reactors.

A typical nuclear reactor, in association with which the fuelling machine to be described below could conveniently be used, has a large number of horizontal tubes each containing a series of fuel slugs or bundles and each arranged to convey fluid coolant under pressure past such bundles for the extraction of heat. Such an arrangement is conventional. Since the nuclear fuel in the bundles is slowly consumed, fresh bundles are loaded into the tubes on one side of the reactor in accordance with a pre-arranged program, while used bundles are withdrawn from the opposite ends of the tubes at the other side of the reactor. Essentially similar machines are employed for loading and unloading.

The machine to be described in detail below is assumed to be employed for loading, but it could equally well act as an unloading machine. It is even possible to interchange the functions of the machines once installed, although it is preferred normally to maintain the flow of bundles unidirectional across the reactor, as this facilitates handling, supply and disposal. Whether performing a loading or an unloading function, each fuelling machine is required firstly to form an extension of a selected reactor fuel tube and then to disengage a pressure sealing plug from the end of such tube. After equalising the pressure in the two machines with that of the coolant in the tube, the plugs in each end of the tube are removed, the ram of the loading machine is withdrawn, its magazine is indexed to position a new fuel bundle in line with the ram, and then the ram is forced to drive the bundle into the tube. At the same time the ram of the unloading machine is withdrawn at a controlled rate to allow a spent bundle to be pushed out of the far end of the tube by the general movement of bundles along the tube. The spent bundle is thus introduced into the magazine of the unloading machine for subsequent disposal. Finally the plugs are replaced at each end of the tube. A similar operation is then carried out with another tube. This description of the manner of operation of a pair of fuelling machines has intentionally been made brief and general. In practice, the sequence of steps involved in a refuelling operation is quite lengthy, but a detailed description of these steps would be out of place in this specification, since the inventive advance with which this specification is concerned involves improvements in the structure and operation of the mechanism for properly and accurately aligning each fuelling machine with the selected reactor tube rather than in the overall fuelling method.

The reactor has a large number of tubes and each of these requires to be supplied with a fresh fuel bundle from time to time. The fuelling machines must thus be moved from tube to tube in fulfillment of their fuelling function. The fuelling machines are comparatively bulky, heavy mechanisms incorporating, as they do, a complex ram mechanism and a magazine that may be full of fuel bundles. These machines require to be aligned accurately with each reactor tube before a fuel transfer operation commences, because, although the free ends of the tubes projecting beyond the reactor have some transverse flexibility allowing them to absorb a measure of initial misalignment at the moment of hooking up, the fuel transfer operation involves projecting the ram mechanism of the machines some distance into the reactor tubes, and such ram mechanisms are comparatively rigid as far as transverse flexure is concerned. Consequently accurate axial alignment of the tube and each fuelling machine is necessary, and the achievement of this result is the principal object of the present invention.

Such result could to some extent be achieved or at least approached by working to very close tolerances in the manufacture and mounting of the fuelling machines, their drive motors, guide rails and other movable parts, but, even with this costly expedient, there would still be room for substantial error arising out of deviation of a reactor tube from its nominal position, either as a result of an initial manufacturing or erection tolerance or subsequent creep due to use, or as a result of thermal or physical stresses set up during use. To be required to compensate for all possible factors of this nature would be most undesirable, and, accordingly, it is a further object of this invention to provide means for achieving axial alignment of a fuelling machine with a reactor tube in a manner that will tolerate some deviation (permanent or temporary) of the tube from its nominal longitudinal axis.

Moreover, it is an object of the invention to achieve this result without necessitating any increase in the precision nature (fineness of tolerances) of the manufacture of the fuelling machines, or the reactor itself, over that dictated by other design considerations.

One manner in which the invention may be carried into practice is illustrated diagrammatically in the accompanying drawings.

Figure 1:
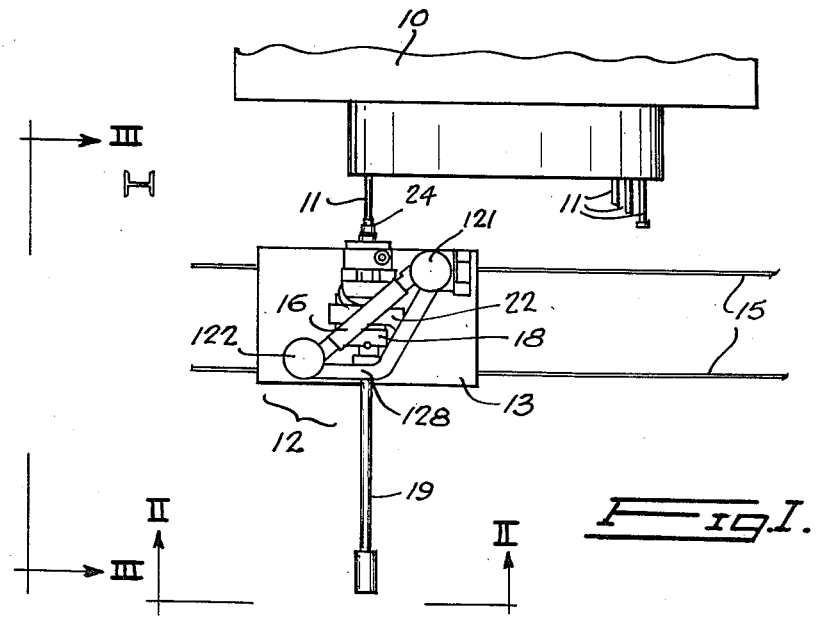
FIGURE 1 is a general, small scale, plan view of a fuelling machine and portion of a reactor with many details omitted.
Figure 2:
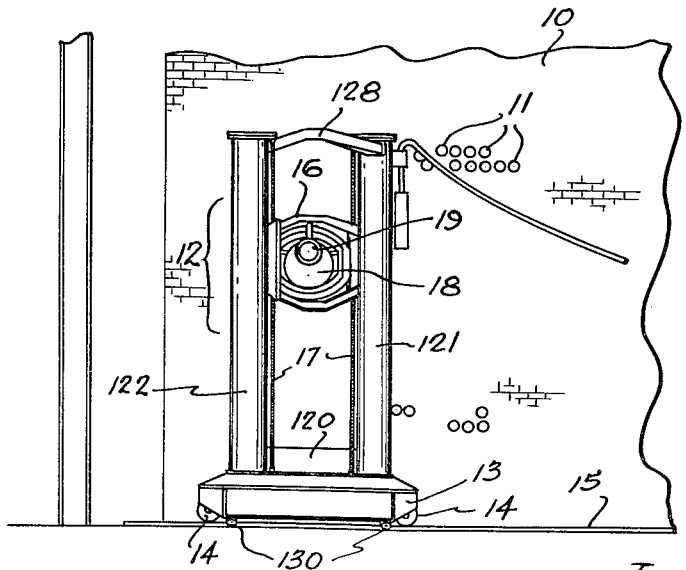
FIGURE 2 is a view on the line II—II in FIGURE 1.
Figure 3:
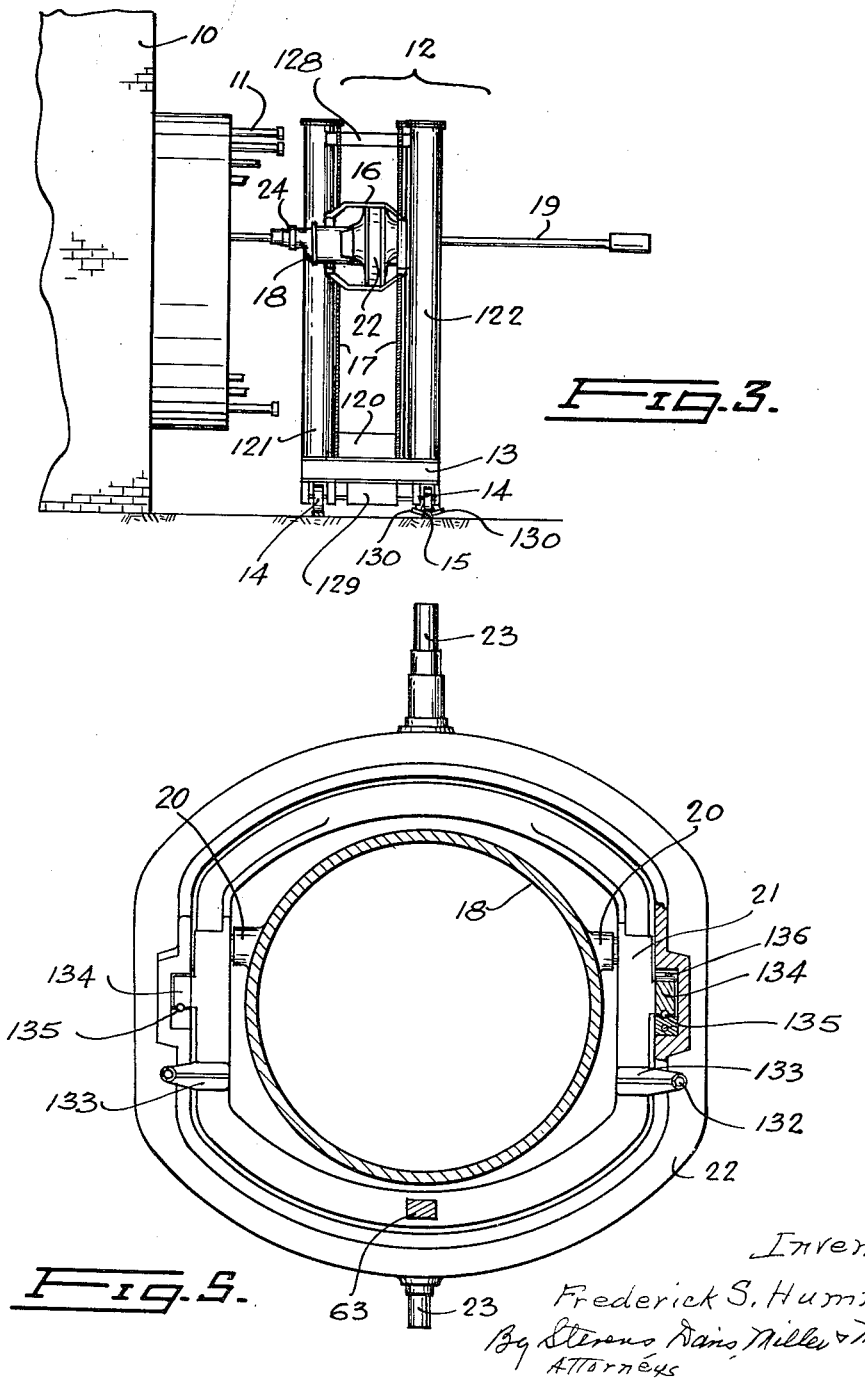
FIGURE 3 is a view on the line III—III in FIGURE 1.
Figure 4:
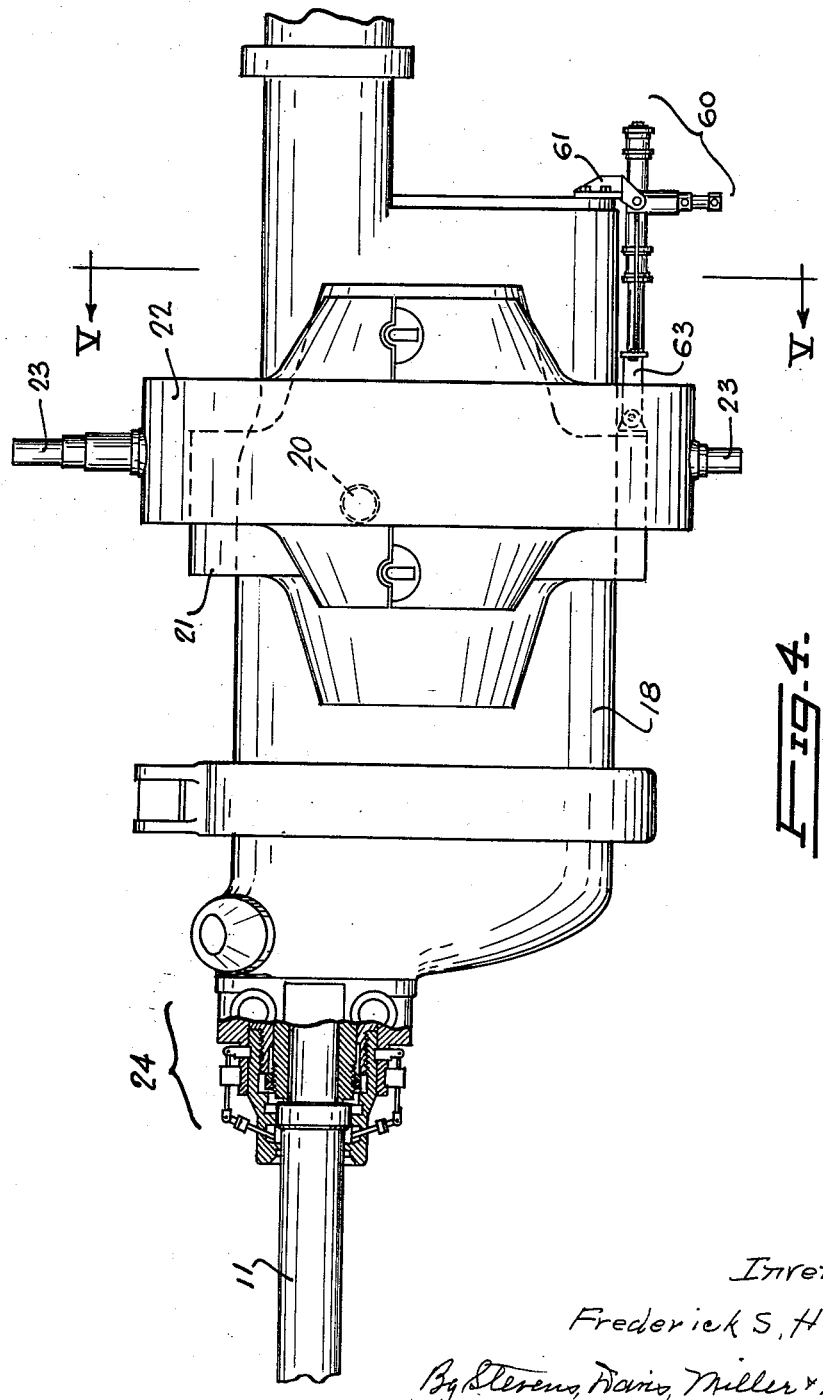
Figure 11:
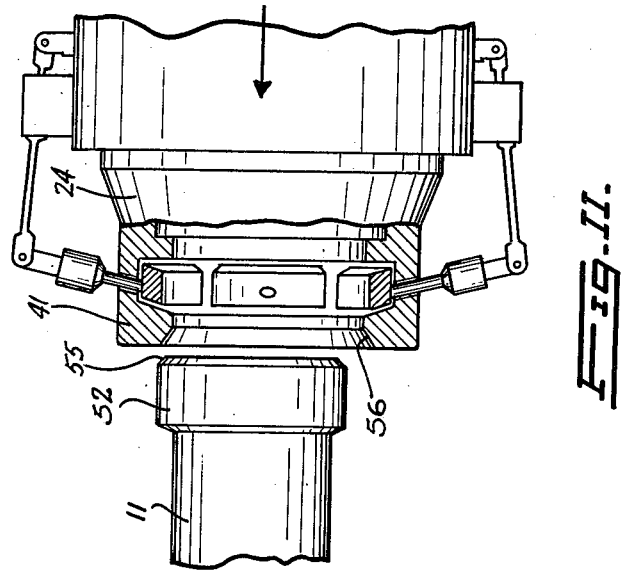
Figure 6:
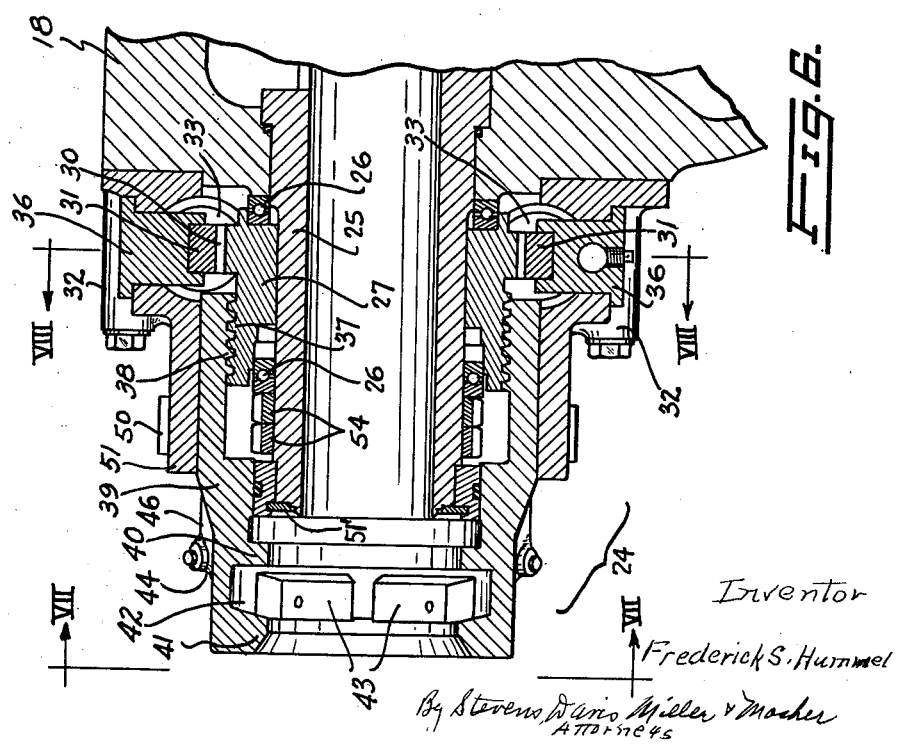
Figure 17:
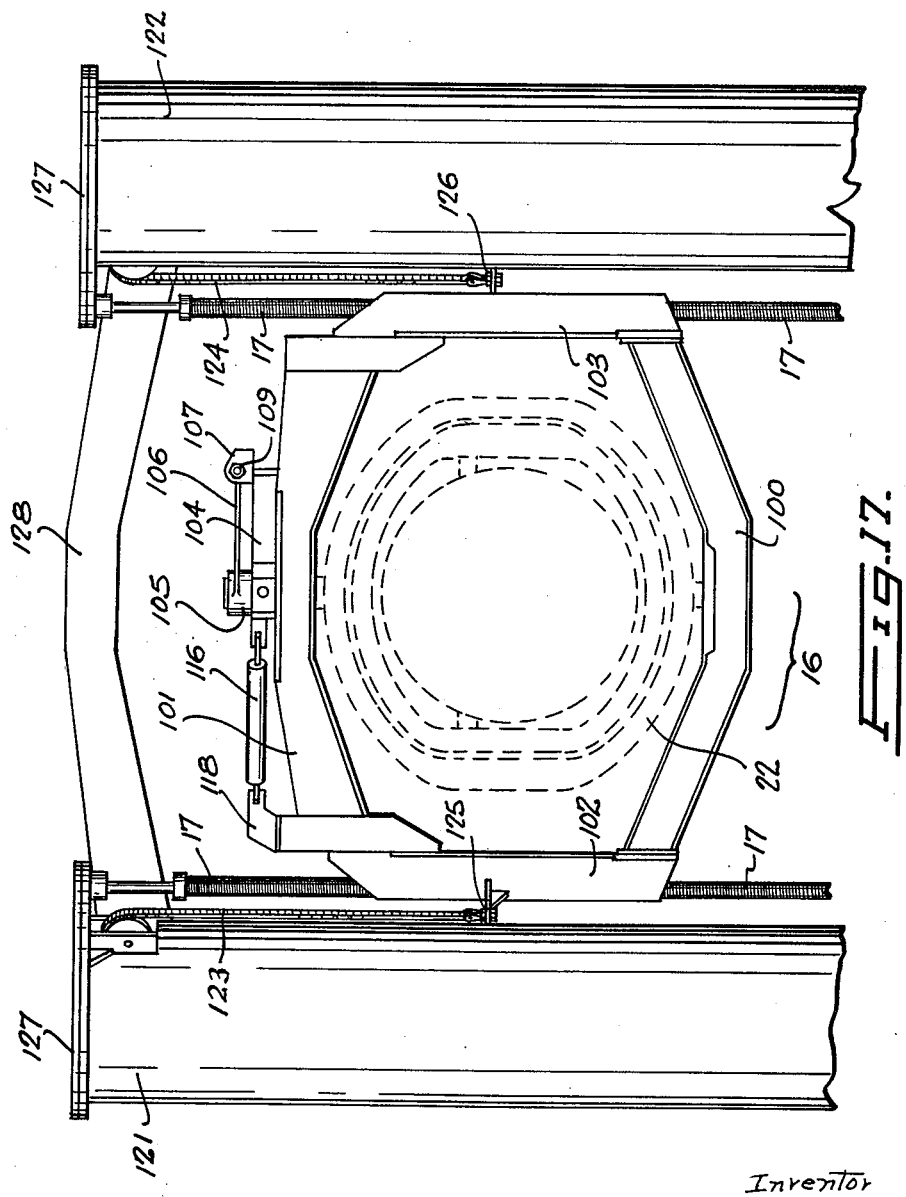

FGURE 4 is a side view, partly cut away to a central section, of the magazine and snout portions of the fuelling machine of FIGURES 1 to 3;

FIGURE 5 is a view of the same machine taken transversely to the view of FIGURE 4 on line V—V with certain of the internal parts omitted for clarity;

FIGURE 6 is an enlarged central section of the snout of the machine seen in FIGURE 4, taken on the line VI—VI in FIGURE 7;

FIGURE 7 is a front view taken on the line VII—VII in FIGURE 6;

FIGURE 8 is a section on the line VIII—VIII in FIGURE 6;

FIGURE 9 is a section on the line IX—IX in FIGURE 7;

FIGURE 10 is a view similar to FIGURE 9 showing the parts in a different position;

FIGURE 11 is a view only partly in section but otherwise similar to FIGURE 9 showing the snout approaching a reactor tube misaligned therewith;

FIGURE 12 is a view similar to FIGURE 4 demonstrating the effect of such a misalignment on the whole assembly;

FIGURE 13 is an enlarged section of the misalignment detection mechanism seen in the lower right hand part of FIGURE 12;

FIGURE 14 is a plan view of this mechanism seen on the line XIV—XIV in FIGURE 13;

FIGURE 15 is a section on line XV—XV in FIGURE 13, except that one of the parts is shown in a different position;

FIGURE 16 is a plan view of the main parts of the machine as a whole, being an enlarged and more detailed view of the central area of FIGURE 1;

FIGURE 16a is an enlarged view of a fragment of FIGURE 16;

FIGURE 17 is generally a view on the line XVII—XVII but with certain parts shown only in outline for the sake of clarity; and FIGURES 18a and 18b are the left and right hand ends respectively of a simplified circuit diagram showing the essential features of operation.

FIGURES 1 to 3 show the function of the machine in general terms. A nuclear reactor 10 has a plurality of horizontal tubes 11 the central portion of each of which contains a series of fuel bundles (not shown). The fuelling machine 12 comprises a frame 13 mounted on wheels 14 engaging rails 15 for rectilinear horizontal movement into alignment with the end of a selected tube 11 which projects beyond the exterior wall (radiation shield) of the reactor. Vertical indexing is achieved by mounting a carriage 16 movably on a pair of vertical screws 17. The magazine 18 and ram mechanism 19 form an assembly that is mounted on the carriage 16 in a manner to be described in detail below.

Reference will now be directed to FIGURES 4 and 5 which show the magazine 18 mounted by means of horizontal trunnions 20 in an inner yoke 21 that is horizontally slidably mounted in an outer yoke 22 that bears vertical trunnions 23 by which the entire assembly is mounted in the carriage 16. Trunnions 20 and 23 may be considered as together constituting a gimbal mounting, although the magazine 18 has three degrees of freedom relative to the carriage 16: pivoting about the horizontal axis of trunnions 20 to raise and lower the snout 24; translation in the axial direction of the machine (that is the axial direction of the ram mechanism and reactor tubes) to bring the snout 24 into or out of engagement with a tube 11; and pivoting about the vertical axis of trunnions 23 to swing the snout 24 from side to side.

The snout 24, seen on a larger scale in FIGURES 6 to 8, consists of an inner tube 25 along which the extended ram mechanism and fuel bundles travel. Tube 25 is fixed to the magazine 18. Mounted coaxially with tube 25 to turn around it on bearings 26 is a collar 27. This collar 27, which is constrained against axial displacement, is fitted with spur teeth 30 meshing with a pair of parallel racks 31 arranged in housings 32 extending across the upper and lower parts of the snout respectively. Each rack 31 carries a piston head 33 on each end, so that rotation of collar 27 between a pair of extreme positions is controlled by fluid pressure in spaces 35 and 35. Racks 31 are held firmly in mesh with teeth 30 by blocks 36 fixed in housings 32.

The collar 27 also carries a thread 37 engaging a mating thread 38 on a sleeve 39 that terminates at its free end in inner and outer annular lips 40 and 41 that project radially inwardly to define an annular cavity 42 between them. In the cavity 42 there are positioned four segments 43 each mounted on the inner end of a radially extending arm 44 that passes through a hole 45 in the sleeve 39 (as best seen from FIGURES 7 and 9). Each arm 44 is pivotally connected at its outer end to one end of a link 46, the other end of which is pivotally connected to a stud 47 secured to the sleeve 39. Each link 46 carries a roller 48 that travels in a cam track 49 formed in a block 50 secured to a forwardly projecting annular flange 51. FIGURES 9 and 10 provide a contrast between the two extreme positions of the sleeve 39. In FIGURE 9, with the sleeve 39 forward, rollers 48 are in the forward parts of their tracks 49, that is the parts most remote from the central axis of the sleeve. Consequently arms 44 and segments 43 are withdrawn sufficiently to allow a reactor tube 11 to enter the snout and abut against a seal 51′ provided on the end of tube 25.

Rotation of collar 27 by racks 31 will slide sleeve 39 backwards to the FIGURE 10 position, rollers 48 moving into the rearward parts of their tracks 49 which action pivots the links 46 to move arms 44 and segments 43 radially inwardly to grip the tube 11 behind an enlarged end rim 52 thereof. Simultaneously with this inward gripping pressure applied to the tube 11, the sliding movement of sleeve 39 relative to tube 25 is transmitted to the arms 44 and segments 43 so that the latter are drawn tightly against the rim 52 to urge such rim tightly against seal 51′. In this way a firm secure attachment of the snout to a tube 11 is achieved. Other parts illustrated are a block 53 providing further sliding support to sleeve 39, and nuts 54 securing the forward bearing 26 in position on the tube 25.

The snout 24 is, in this way, locked on to the end of a reactor tube 11. The ram mechanism will then be brought forward to remove the plug from within the end of the tube. This operation is fully described in United States patent application of Frederick S. Hummel, Serial No. 177,567, filed March 5, 1962, and will not be further described herein.

The description in relation to FIGURES 9 and 10 assumes perfect axial alignment of snout and tube, as the two come together. As explained above, only coarse alignment will normally be experienced in practice, and the principal object of the invention is to provide for correction of the situation that is created by the initial absence of fine alignment of tube and snout. Such misalignment is demonstrated by FIGURE 11 which shows the snout 24 approaching a tube 11. It will be observed that the rim 52 of the tube 11 has a chamfered guiding end surface 55 against which a complementarily chamfered guiding surface 56 of the lip 41 of the snout 24 is just about to come to bear. It is assumed that the initial misalignment is never so great that these guiding surfaces will fail to engage, and it is merely a matter of designing the guiding surfaces to be of sufficient extent to ensure their mutual co-operation even under the worst conditions of initial misalignment that can be contemplated.

As soon as the guiding surfaces 55 and 56 touch, continued feeding to the left of the snout 24 has the effect of tilting the entire magazine and snout assembly in the manner shown (somewhat exaggerated) in FIGURE 12. This tilting is detected by a mechanism 60 shown generally in FIGURE 12 and in detail in FIGURES 13 to 15.

A bracket 61 pivotally secures the housing 62 of the detection mechanism 60 to the magazine 18, and an articulated bracket 63 secures a central rod 64 of mechanism 60 to the inner yoke 21. Since in the FIGURE 12 position the magazine 18 has been tilted relatively to the inner yoke 21 about trunnions 20 (see FIGURE 5), parts connected to the magazine 18 and yoke 21 and offset from such trunnions will detect such tilting by relative motion. In mechanism 60 this relative motion is detected by a transducer 65 (FIGURE 14) mounted on bracket 63 and having its movable detecting element connected to a rod 66 that extends rigidly from housing 62. Transducer 65 provides an electrical signal the nature and function of which will be described in detail below in connection with the control circuit. At the present stage in the description, it is sufficient to state that the signal emitted by transducer 65 acts to correct the misalignment by elevating the carriage 16 a necessary amount to bring the snout 24 of the machine into proper axial alignment with tube 11.

The rod 64 of mechanism 60 carries a stop 66′ secured to its free end and a further stop 67 secured to it, near its connection to bracket 63, the stops 66′ and 67 facing towards each other to act as stops for the outer ends of a pair of coil springs 68 and 69 that extend around respective ends of the rod 64. Between these two ends the rod 64 is formed with two enlarged portions 70 and 71 that slide in the housing 62 and define between them an annular slot 72 in which a locking mechanism can engage. Interposed between the inner ends of the springs 68 and 69 and portions 70 and 71 are radially inwardly projecting end flanges 73 and 74 of cover tubes 75 and 76 that respectively surround the two springs and carry adjustable extensions 77 and 78 that slidingly engage appropriate surfaces on respective stops 67 and 66'.

Assume bracket 61 is moved to the left in relation to a stationary rod 64 (as when the magazine is tilted in FIGURE 12). Housing 62 is moved to the left, and it in turn pushes cover tube 75 to the left to compress spring 68. At the other end of the rod 64 the spring 69 is not allowed to expand, because the rod 64 and its enlarged portions 70 and 71 are stationary and the flange 74 bears against portion 71. The spring 69 is operative in compression when tilting of the magazine 18 is in the other sense to that assumed. Whichever of these springs is compressed, it provides a restoring force opposing the tilt and ensuring that the magazine 18 returns to a true horizontal attitude when the carriage 16 is raised or lowered, as the case may be, during the restoring operation.

When these parts are to be locked in the central position, the slot 72 is snugly engaged by a finger 79, thus preventing any further relative movement between housing 62 and rod 64. As the description of the control circuit below will indicate, such locking is only effective when the snout 24 has been withdrawn from a tube 11 (FIGURE 10). Finger 79 is spring urged to the upper position (FIGURE 15) and is connected to the armature assembly 80 of a solenoid 81 whereby such finger 79 is controlled. The actual position of finger 79 is sensed by a pair of balls 82 and 83 for engagement in slots 84 and 85 positioned in the finger 79 to be in register with a respective ball at each of the two ends of its throw. Each ball is urged inwardly towards its slot by a spring 86, 87, the head 88, 89 of a rod 90, 91 being interposed between each ball and its spring. Rods 90, 91 form the actuating members of microswitches 92, 93 that are firmly secured by plates 94 to the lower part of the housing 62. Key 95 fixed in housing 62 slidingly engages slot 96 in finger 79.

Attention will now be shifted to the manner in which the machine detects misalignment in the horizontal plane when the snout 24 moves in to engage a tube 11. No plan view equivalent to FIGURE 12 but showing the misalignment horizontal has been considered necessary, because it can readily be seen that any horizontal misalignment will cause surfaces 55 and 56, on coming together, to try to swing the magazine 18 about a vertical axis. This swinging motion is transmitted through inner yoke 21 (FIGURE 5) to outer yoke 22 and hence to the trunnions 23 of such outer yoke. It will be convenient at this point to focus attention on FIGURES 16, 16a and 17 which show the manner in which the outer yoke 22 is mounted in the carriage 16 by means of its trunnions 23. Carriage 16 is a generally rectangular frame formed of bottom, top and side members 100, 101, 102 and 103 respectively. The lower trunnion 23 is freely pivotally mounted in the bottom frame member 100, and the upper trunnion 23 passes freely up through the upper frame member 101 and an indexing plate 104 to engage the boss 105 of a horizontally extending arm 106. A portion of the plate 104 underlies the arm 106 and has secured to its end a pair of spaced, upstanding brackets 107, 108 between which there extends a rod 109 on which a block 110 fixed to the end of arm 106 can slide. Coil springs 111 and 112 surround the rod 109 on each side of the block 110 and act between the respective brackets 107 and 108 and the two sides of the block 110 to produce a centering effect on the block. The plate 104 is normally locked in the position shown by mechanism arranged beneath it and not visible in the drawings. Any turning of the yoke 22 is transmitted to arm 106, and whichever of the springs 111, 112 that is compressed by this movement, exerts a restoring force opposing the movement. Actual achievement of alignment of snout 24 with tube 11 requires bodily horizontal movement of the carriage 16 which is obtained by moving the frame 13 of the machine along the rails. Such movement, details of which are described below in connection with the control circuit, is initiated by a transducer 115 the coil of which is connected to the block 110. The core extension 113 of the transducer 115 is connected to bracket 107. It will be apparent that transducer 115 thus senses any rotation of arm 106 relative to plate 104. This rotation is limited by adjustable stops 200 and 201.

In view of the extreme length of the ram mechanism 19 (see FIGS. 1 and 3) it is desired to be able to turn the outer yoke 22, and with it the magazine 18 and ram mechanism 22 to the position indicated by the broken lines in FIGURE 16. In this position the entire machine can be propelled along the rails 15 to pass readily through a door, out of the area adjacent the end of the reactor, and into a further compartment for recharging or emptying the magazine, as the case may be. Without a turn through 90°, the door would have to be as wide as the full length of the machine. This 90° turn is achieved by turning plate 104 and with it arm 106 through 90° by extending the piston of a hydraulic cylinder 116, such piston being connected to a lug 117 on the plate 104, while its cylinder is connected to a fixed upstanding bracket 118 of the carriage 16. The locking mechanism for arm 104 previously referred to can then lock the same in its new position. The projection 119 on arm 104 acts as a stop and co-operates with the locking mechanism in the turned position.

As will be best seen from FIGURE 17, the side members 102 and 103 of the carriage 16 respectively embrace the pair of vertical screws 17. Fixed nuts surrounding these screws are mounted in members 102, 103, so that turning of the screws raises or lowers the carriage. Screws 17 are turned by an electric drive shown diagrammatically at 120 (FIGURES 2 and 3). The weight of carriage 16 and the parts it supports is approximately balanced by counterweights inside pillars 121, 122 supported by chains 123, 124 connected to side members 102, 103 respectively by brackets 125, 126. Pillars 121, 122 each carry a plate 127 at the top, which plate also serves to support the upper end of a screw 17. Beam 128 interconnects the upper ends of pillars 121, 122 for rigidity.

An electric drive 129 (FIGURE 3) is provided for driving the wheels 14. The machine is kept on the rails 15 by side bearing idlers 130.

Thus motor drive 129 controls horizontal movement of the snout 24 parallel with rails 15 (known as X direction movement); motor drive 120 controls vertical movement of the snout 24 (known as Y direction movement); and horizontal movement of the snout 24 in the other, Z, direction (that is towards and away from a tube 11) is controlled by relative sliding motion of inner yoke 21 (which supports magazine 18) within outer yoke 22. Compare the three positions of FIGURES 4, 12 and 16; FIGURE 4 shows the most advanced position, FIGURE 12 shows an intermediate position and FIGURE 16 shows the fully retracted position. This movement takes place under the control of two hydraulic cylinders 131 (FIGURE 12) mounted each on a respective side of the outer yoke 22 and each having a piston rod 132 connected to a bracket 133 fixed to the inner yoke 21 (see also FIGURE 5). Sliders 134 secured to the inner yoke 21 travel in corresponding slots in the outer yoke 22 between ball bearings 135 and spring loaded rollers 136.

It is noteworthy that the horizontal axis defined by trunnions 20 is slightly above although in the same vertical plane as the centre of gravity of the magazine and ram assembly which is pivoted on such trunnions. This is true whether the magazine is full or empty, since the centre of gravity varies only very slightly with the magazine load.

A simplified control circuit showing the salient features of the operation of the machine already described is contained in FIGURE 18. Initially the operator (who may be a human operator, or may be a computer) selects the desired tube 11 by closing the appropriate one of a group of X selection switches 140 and the appropriate one of a group of Y selection switches 141. Each switch 140, 141 is connected to a predetermined point on banks of potential dividers 142, 143 whereby to receive voltages proportional to the X and Y travels required for the machine snout 24 to achieve theoretical alignment with the selected tube 11. The X motor drive 129 is fitted with a rheostatic sensor 144 which records the number of revolutions of the drive and hence provides a coarse indication of the position of the machine along the rails 15. A similar sensor 145 associated with the Y motor drive 120 provides a coarse indication of the vertical position of the machine snout 24.

The operator then actuates a forward switch F which energises a forward relay 180, provided a pair of normally open contacts 181 of a relay 132 are closed, that is, provided relay 182 is energised through a first pair of contacts 183 of a Z limit switch 184 associated with one of the Z motion cylinders 131 (see also FIGURE 12). Contacts 183 are only closed when the piston rod 132 of cylinder 131 is in its fully extended position, that is, the snout 24 is fully withdrawn from the array of tubes 11. Thus, withdrawal from the previous loading operation must have been complete, before a fresh operation can commence.

Relay 180 includes self holding contacts 185 as well as a pair of contacts 186 arranged in series with a pair of self holding contacts 187 of the relay 182. Thus, energisation of relay 180 by switch F serves to hold relay 182 closed, even when the limit switch contacts 183 subsequently open during a loading operation. However, once relay 180 is deenergised, so is relay 182, which later can only be re-energised by closure of the limit switch contacts 183.

Relay 180 includes four sets of contacts 188, 189, 190 and 191 arranged in the leads from switches 140, 141 and sensors 144, 145, whereby the outputs from the selected potential dividers 142, 143 are compared with the outputs from sensors 144, 145 in X comparator 146 and Y comparator 147. A difference signal is fed in each case to an X amplifier 148 and a Y amplifier 149. The amplifiers control the supply of power to the X and Y motors 129 and 120 respectively. Thus, initially, when a new setting is chosen by switches 140 and 141, the motors are both energised until the snout 24 has been aligned with the selected tube 11 within the limits of accuracy of sensors 144 and 145. This brings the snout 24 quite close to true alignment with the tube 11, somewhat as illustrated in FIGURE 11, for example.

When such coarse alignment has been achieved the outputs of amplifiers 148, 149 will have dropped to zero. Such outputs are fed to a NOT AND gate 150 which energises a relay 151 only when no signal is received from both amplifiers. Relay 151 will consequently be energised as soon as coarse alignment has been achieved. Relay 151 has two sets of normally open contacts 152 and 154 that are closed by energisation of the relay, and one set of normally closed contacts 153. Contacts 152 energise a further relay 155 which has normally closed contacts 156 and 157 (which are now opened) in the leads from comparators 146, 147 to amplifiers 148, 149 respectively, and normally open contacts 158 and 159 (which are now closed) connecting the X and Y transducers 115 and 65 to the respective amplifiers 148 and 149. No signals will be emitted by the transducers at this time as the tilting and twisting machine parts are held in central positions by the springs 68, 69, 111 and 112.

When contacts 153 are opened they de-energise electromagnetic brakes 160 associated with both motors 120, 129. These brakes are of the type which are normally applied by spring pressure, and must be electrically energised to be released. Hence opening contacts 153 applies the motor brakes. Contacts 154 energise a Z solenoid valve 161 to admit fluid pressure to Z cylinders 131. As a result the inner yoke 21 is moved forward as already described to bring the snout 24 into contact with the end of the tube 11. Assuming that such contact causes tilting or twisting or both (FIGURE 12 for example), one or other or both of the transducers 115 and 65 will feed a corresponding signal to its associated amplifiers 148, 149.

The amplifiers 148, 149 energise the motors 129, 120 in slow speed in the correct direction to compensate for the misalignment, during which time an output from either amplifier will have temporarily triggered gate 150 to deenergise relay 151 and electrically release the brakes 160. The forward movement in the Z direction will also have been temporarily arrested by deenergisation of valve 161 by opening of contacts 154. Relay 155 remains energised, however, through a pair of self-holding contacts 162.

When fine alignment has been achieved in this way, relay 151 is reenergised to restart the forward feed in the Z position. This continues until either further tilting or twisting is caused by the additional Z motion, in which case the adjusting steps just explained are repeated, or the full Z travel is accomplished bringing the parts to the position seen in FIGURE 9 and causing the flat end of the rim 52 of the tube 11 to bear against a limit switch 163 embedded in the end of the inner tube 25 of the snout 24 (FIGURES 9 and 10). Limit switch 163, as shown in FIGURE 18, has a pair of normally closed contacts 164 in series with contacts 154 controlling energisation of valve 161, a pair of normally open contacts 165 for completing the circuit of a ready-to-clamp signal (not further shown), and a pair of normally closed contacts 192 holding a relay 193 energised, in which condition its contacts 194, 195, 196 and 197 complete the connections to the amplifiers 148 and 149 respectively, and the direct and holding circuits to relay 155.

Operation of limit switch 163 thus stops forward feeding in the Z direction; advises the operator that the machine is ready to clamp on, that is change from the FIGURE 9 condition to the FIGURE 10 condition; and deenergises relay 193 to disconnect the amplifiers from further inputs and deenergise relay 155 to return it to its original position. Relay 151 remains energised (there being no output from amplifiers 148, 149) to keep brakes 160 applied. The manner in which the operator controls the clamping on and subsequent operations is beyond the scope of the present description.

It should be mentioned, however, that should there be any further misalignment due either to inaccuracies in the manufacture of the end fitting of the tube 11, or to variations in the angularity of the longitudinal axis of the tube resulting from changes in the reactor structure, or to a minor inaccuracy in the alignment of the snout 24, such misalignment will be accommodated by the flexibility of the tube 11 with accompanying further tilting and/or twisting of the magazine 18. Such tilting or twisting will not actuate the motors 120, 129, because the control circuit has been disconnected by deenergisation of relay 193. By thus taking advantage of the flexibility of the tubes 11, it is possible to achieve a satisfactory degree of alignment, without the need to employ a control system with a high degree of sensitivity. Thus the combination of a gimbal-supported magazine (trunnions 20 and 23) with a flexible reactor tube, has enabled a sufficient degree of alignment to be achieved with a control circuit having a degree of sensitivity substantially less than would be required if it were necessary to align a rigidly mounted magazine with a rigid tube.

When a loading operation has been completed and the snout 24 unclamped from a tube 11, the operator actuates a withdraw switch W which opens the circuit to relay 180 and thus deenergises both this relay and relay 182. As well as opening the contacts 188 to 191 to prevent energisation of the comparators 146, 147 at this stage, deenergisation of relay 180 opens a pair of contacts 198 in the forward circuit to the Z cylinder valve 161 to prevent this circuit being completed when the limit switch 163 is reversed to close contacts 164 on withdrawal of the snout 24 from a tube end fitting. At the same time, a pair of normally closed contacts 199 makes a circuit to energise solenoid valve 161 to operate the Z cylinders 131 in the reverse direction to withdraw the snout 24. Not until this motion is complete will Z limit switch 184 again close to allow relays 180 and 182 to be reenergised when another loading operation is initiated by switch F.

A second pair of contacts 203 on the limit switch 184 energises a relay 204 when the inner yoke 21 is fully retracted, to open contacts 205 to release solenoid 81 and allow finger 79 to be moved by spring pressure to its locking position (FIGURE 15). The magazine 18 is then locked against tilt during subsequent indexing of the snout 24 into alignment with another tube 11, and is not released until the limit switch 184 reopens on commencement of another forward movement in the Z direction. Comparable locking against twist could be provided if desired, but is not normally found necessary, as adequate protection against horizontal oscillation of the pivoted parts is provided by stops 200, 201.

I claim:

1. In a fuelling machine for a nuclear reactor having a snout for clamping onto a flexible, projecting end of a reactor tube to form a coaxial continuation thereof;
   (a) gimbal means mounting said snout for pivotal movement about two mutually perpendicular axes both perpendicular to the axial direction of the snout,
   (b) means for moving the snout in its axial direction generally towards a selected tube,
   (c) means for sensing and automatically correcting pivotal displacement of the snout about each of said axes resulting from contact between said snout and tube,
   (d) and means for clamping said snout and tube together,
   (e) said gimbal means being such that said snout remains free to pivot about said axes after clamping onto said tube whereby, in combination with a flexibility of the tube, to absorb minor inaccuracies of misalignment existing at the time of clamping on or occurring thereafter.

2. In the combination of a nuclear reactor and a fuelling machine having a snout for clamping on to an end of a reactor tube to form a coaxial continuation thereof: a plurality of fuel tubes having flexible ends projecting from said reactor; and means in said machine for aligning the snout thereof coaxially with a said flexible tube, said means comprising
   (a) a gimbal means mounting said snout for pivotal movement about two mutually perpendicular axes both perpendicular to the axial direction of the snout,
   (b) means for moving the snout in its axial direction generally towards a selected tube,
   (c) means for sensing and automatically correcting pivotal displacement of the snout about each of said axes resulting from contact between said snout and tube,
   (d) and means for clamping said snout and tube together,
   (e) said gimbal means being such that said snout remains free to pivot about said axes after clamping onto said tube whereby, in combination with the flexibility of the tube, to absorb minor inaccuracies of misalignment existing at the time of clamping on or occurring thereafter.

3. In a fuelling machine for a nuclear reactor having a snout for clamping on to a flexible, projecting end of a reactor tube to form a coaxial continuation thereof; means for aligning the snout coaxially with the tube, said means comprising
   (a) a carriage,
   (b) means mounting the snout on the carriage,
   (c) said mounting means including means yieldingly retaining the snout in predetermined position relative to the carriage in two mutually perpendicular directions both perpendicular to the axial direction of the snout,
   (d) means supporting the carriage including motor means for moving the carriage in each of said two directions,
   (e) means controlling the motor means to position the carriage with the snout in coarse alignment with a selected reactor tube,
   (f) power operated means for moving the snout in its axial direction towards the tube,
   (g) means for sensing displacement of the snout from its predetermined position in each of said two directions as a result of contact between co-operating guiding surfaces on the snout and the tube,
   (h) and means connecting said sensing means to said control means to energise the motor means to modify the position of the carriage to eliminate any said displacement and thereby effect fine alignment of the snout with the selected reactor tube.

4. In a fuelling machine for a nuclear reactor having a snout for clamping on to a flexible, projecting end of a reactor tube to form a coaxial continuation thereof; means for aligning the snout coaxially with the tube, said means comprising
   (a) a carriage,
   (b) means mounting the snout on the carriage for pivotal movement about two mutually perpendicular axes both perpendicular to the axial direction of the snout,
   (c) said mounting means including means yieldingly retaining the snout in predetermined angular position relative to the carriage about said two axes,
   (d) means supporting the carriage including motor means for moving the carriage in two directions respectively parallel with said two axes,
   (e) means controlling the motor means to position the carriage with the snout in coarse alignment with a selected reactor tube,
   (f) power operated means for moving the snout in its axial direction towards the tube,
   (g) means for sensing pivotal displacement of the snout from its predetermined position about each of said axes as a result of contact between co-operating guiding surfaces on the snout and the tube,
   (h) and means connecting said sensing means to said control means to energise the motor means to modify the position of the carriage to eliminate any said displacement and thereby effect fine alignment of the snout with the selected reactor tube.

5. A fuelling machine according to claim 4, including means connecting the sensing means with the power operated means for moving the snout in its axial direction to deenergise said means upon sensing of a displacement of the snout from its predetermined position relative to the carriage in either of said directions.

6. A fuelling machine according to claim 5, including means sensitive to substantially correctly aligned engagement of the tube by the snout for initiating clamping of said snout onto said tube and for deenergizing said motor means.

7. A fuelling machine according to claim 6, including means for actuating said power operated means for withdrawing the snout from the tube after a fuelling operation and unclamping thereof, said means including means for deenergising said motor means until completion of said withdrawal.

8. In a fuelling machine for a nuclear reactor having a snout for clamping on to a flexible, projecting end of a reactor tube to form a coaxial continuation thereof; means for aligning the snout coaxially with the tube, said means comprising
   (a) a carriage,
   (b) an outer yoke mounted for pivotal movement about a vertical axis on said carriage, (c) an inner yoke horizontally slidably mounted on said outer yoke in the axial direction of the snout,
(d) an elongated assembly comprising a magazine and a ram mechanism mounted on said inner yoke for pivotal movement about a horizontal axis,
(e) said snout being mounted on said assembly,
(f) means supporting the carriage including motor means for moving the carriage in two directions respectively parallel with said two axes,
(g) means controlling the motor means to position the carriage with the snout in coarse alignment with a selected reactor tube,
(h) power operated means for moving the inner yoke and hence the snout in its axial direction towards the tube,
(i) means for sensing pivotal displacement of said assembly from its predetermined position about each of said axes as a result of contact between cooperating guiding surfaces on the snout and the tube,
(j) and means connecting said sensing means to said control means to energise the motor means to modify the position of the carriage to eliminate any said displacement and thereby effect fine alignment of the snout with the selected reactor tube.

9. A fuelling machine according to claim 8, including means for indexing said outer yoke about said vertical axis relative to said carriage to a position aligning said snout and elongated assembly with one of said directions for travel in such direction away from the reactor.

References Cited by the Examiner
UNITED STATES PATENTS

| | | | |
|---|---|---|---|
| 2,725,993 | 12/55 | Smith | 214—23 |
| 2,855,114 | 10/58 | Ohlinger | 214—23 |

CARL D. QUARFORTH, *Primary Examiner.*